United States Patent
Rakutt et al.

(10) Patent No.: US 12,485,642 B2
(45) Date of Patent: Dec. 2, 2025

(54) CONTOURED STRUCTURAL ELEMENT AND PRODUCTION OF THE CONTOURED STRUCTURAL ELEMENT

(71) Applicant: Airex AG, Sins (CH)

(72) Inventors: Dietmar Rakutt, Cham (CH); Roman Gätzi, Hünenberg See (CH); Martin Gaul, Birrhard (CH)

(73) Assignee: Airex AG, Sins (CH)

( * ) Notice: Subject to any disclaimer, the term of this patent is extended or adjusted under 35 U.S.C. 154(b) by 225 days.

(21) Appl. No.: 18/018,313

(22) PCT Filed: Jul. 15, 2021

(86) PCT No.: PCT/EP2021/069707
§ 371 (c)(1),
(2) Date: Jan. 27, 2023

(87) PCT Pub. No.: WO2022/023049
PCT Pub. Date: Feb. 3, 2022

(65) Prior Publication Data
US 2023/0294377 A1    Sep. 21, 2023

(30) Foreign Application Priority Data
Jul. 29, 2020  (EP) .................................... 20188418

(51) Int. Cl.
*B32B 3/30* (2006.01)
*B32B 5/18* (2006.01)
(Continued)

(52) U.S. Cl.
CPC .................. *B32B 3/30* (2013.01); *B32B 5/18* (2013.01); *B32B 27/065* (2013.01); *B32B 27/36* (2013.01);
(Continued)

(58) Field of Classification Search
None
See application file for complete search history.

(56) References Cited

U.S. PATENT DOCUMENTS

| | | |
|---|---|---|
| 3,540,967 A | 11/1970 | Shook et al. |
| 3,841,958 A | 10/1974 | Delorme |

(Continued)

FOREIGN PATENT DOCUMENTS

| | | |
|---|---|---|
| DE | 2930887 A1 | 2/1981 |
| DE | 3937969 A1 | 5/1991 |

(Continued)

OTHER PUBLICATIONS

Schindele, P., Aug. 25, 2016, machine translation of DE 102015203375 (Year: 2016).*

(Continued)

*Primary Examiner* — Chinessa T. Golden
(74) *Attorney, Agent, or Firm* — Bachman & LaPointe, P.C.

(57) ABSTRACT

The invention relates to a contoured structural element (100) for use as a core layer in a curved sandwich composite element, the contoured structural element (100) being formed from a thermoplastic foam, in particular PET, the contoured structural element (100) being subdivided, except for a connecting layer (12), into a plurality of body elements (10), and the body elements (10) and the connecting layer (12) being aligned parallel to a base area (26) of the contoured structural element (100) which is in a planar state. According to the invention, at least one surface layer (16) of the connecting layer (12) and the adjoining surface layer (18) of the body elements (10) at least partly have a thermally densified layer (14); the body elements (10), the connecting layer (12) and the thermally densified layer (14) being made of the same material.

18 Claims, 4 Drawing Sheets

(51) Int. Cl.
 *B32B 27/06* (2006.01)
 *B32B 27/36* (2006.01)
(52) U.S. Cl.
 CPC ....... *B32B 2250/03* (2013.01); *B32B 2250/40* (2013.01); *B32B 2266/0264* (2013.01); *B32B 2307/7376* (2023.05); *B32B 2603/00* (2013.01)

(56) References Cited

U.S. PATENT DOCUMENTS

| | | | |
|---|---|---|---|
| 3,964,354 | A | 6/1976 | Johannsen |
| 4,121,008 | A | 10/1978 | Seddon |
| 2002/0106503 | A1 | 8/2002 | Monk et al. |
| 2003/0008127 | A1* | 1/2003 | Stimler ............... B29C 44/5636 428/304.4 |
| 2005/0182239 | A1 | 8/2005 | Lang et al. |
| 2006/0124287 | A1 | 6/2006 | Reinders |
| 2010/0189973 | A1 | 7/2010 | Mikkelsen et al. |
| 2010/0209651 | A1 | 8/2010 | Mikkelsen et al. |
| 2010/0254819 | A1 | 10/2010 | Rakutt et al. |
| 2011/0091715 | A1 | 4/2011 | Rakutt et al. |
| 2011/0165363 | A1 | 7/2011 | Wolf et al. |
| 2013/0294925 | A1* | 11/2013 | Appleton ............. H01Q 17/007 416/241 R |
| 2015/0125686 | A1* | 5/2015 | Rakutt ................ B32B 38/0004 428/317.1 |
| 2016/0016339 | A1 | 1/2016 | Lavoie |

FOREIGN PATENT DOCUMENTS

| | | |
|---|---|---|
| DE | 10034990 A1 | 2/2002 |
| DE | 102012102689 A1 | 9/2013 |
| DE | 102015203375 A1 * | 8/2016 |
| EP | 2483076 B1 | 8/2016 |
| EP | 3656527 A1 | 5/2020 |
| GB | 1274569 A | 5/1972 |
| GB | 2489212 A | 9/2012 |
| WO | 2009003477 A1 | 1/2009 |
| WO | 2012123551 A1 | 9/2012 |
| WO | 2020064717 A2 | 4/2020 |

OTHER PUBLICATIONS

International Search Report and Written Opinion Dated Oct. 29, 2021 for corresponding application PCT/EP2021/069707.
Gurit Core Materials Brochure, Gurit Services AG, Switzerland, Aug. 2017 with signed declaration evidencing date of brochure.
3A Composites Core Materials Brochure, Mar. 2020.
3A Composites Press Release Airex T92.100 SealX, Apr. 30, 2018.
Redesigning the core materials landscape, Reinforced Plastics, Dec. 11, 2012.
Letter from Armacell Benelex S.A. filed at EPO on Apr. 23, 2015 in opposition against EP2670591B.
Diab Finishing Brochure, Diab Group, Sweden, Nov. 2017.

* cited by examiner

CONTOURED STRUCTURAL ELEMENT AND PRODUCTION OF THE CONTOURED STRUCTURAL ELEMENT

BACKGROUND OF THE INVENTION

The present invention relates to a contoured structural element and to a method for producing a contoured structural element of this type.

Generic contoured structural elements are used as a core layer in curved sandwich composite elements, in particular for the production of wind vanes for wind turbines and/or for marine applications, in particular for the production of boat hulls and boat decks, for rail transport applications, for road mass transport applications and for structural applications in the construction sector, components having single or double curvatures or other complex three-dimensional contours. In a curved state, the contoured structural element is glued to one or to a plurality of cover layers, preferably made of a fiber-reinforced plastic, in a sandwich-like manner to form a curved sandwich composite element which has a high bending stiffness combined with a low dead load.

DE 10 2012 102 689 A1 of the applicant describes a plate-shaped, partly welded structural element for use as a core layer in a sandwich composite element, the plate-shaped structural element being formed from a plurality of body segments made of an extrusion-foamed thermoplastic, in particular PET, which are welded together, and the plate-shaped structural element being produced from a foamed plastic block by means of a hot-element cutting method.

Plate-shaped structural elements for the use as a core layer in a sandwich composite element, for example made of balsa wood or a plastic foam, are generically characterized by a low dead load, but also by a low elasticity and a low break resistance. Thus, plate-shaped structural elements are suitable only to a limited extent as a core layer for curved sandwich composite elements.

U.S. Pat. No. 3,540,967 A1 describes a structural element which is suitable and intended for the use as a core layer in a curved sandwich composite element. The structural element consists of individual body elements or blocks with a rectangular cross section which are connected unilaterally and at a defined distance to a scrim or scrim material. The scrim material, for example a fiberglass net, acts like a hinge between the individual body elements and allows a curvature of the structural element. In the production, a plurality of plate-shaped elements of the raw material are divided into individual blocks by means of a sawing process and are subsequently unilaterally provided with the scrim material, the body elements being disposed at a distance to each other. This distance or space between the body elements is in particular required if the structural elements are to be placed in a concave mold with the side of the scrim material.

DE 10 2015 203 375 A1 describes a method for processing foamed workpieces, a rotating tool being pressed on a surface of the foamed workpiece in a longitudinal movement to densify the surface. The foamed workpiece is processed along the surface with slight recesses and without material removal in order to produce a dense surface, in particular against fluids or gases in this manner. Thus, the slight recesses are unable to form a space with body elements which can be curved towards each other in the manner of a hinge.

A generic scrim application method can comprise a plurality of complex, in particular time-consuming, steps. In the method, a scrim material soaked with adhesive resin is applied to the body elements and the scrim material is aligned. Subsequently, the adhesive resin is cured while it must be ensured that the alignment of the body elements is not changed.

Furthermore, an alternative scrim application method in which a scrim material having fibers pre-soaked with adhesive (hot-melt) is applied to a rigid plate without slits by means of heat and pressure is known from the state of the art. Subsequently, the plate having the scrim material is slit or sawn on one side in a longitudinal and transverse direction.

EP 2 483 076 B1 also describes a contoured structural element which is formed by a plurality of body elements. As a hinge-like connection between the body elements, a scrim material is used, which holds together separate body elements and which reinforces a connecting layer between not fully separated body elements, which are partly separated by recesses/contours in the structural element, for example.

Generic core materials made of foamed plastic are locally held together pore-wise, the pore walls being configured as thin as possible to reduce the weight of the core material for lightweight construction applications. Because of the local pore-wise cross-sectional reduction of the material, a foamed plastic has a brittle fracture behavior under macroscopic examination. This is also the case if the plastic has a ductile or tough fracture behavior in the non-foamed state. Therefore, contoured structural elements made of foamed plastics require a scrim material acting in the manner of a hinge.

SUMMARY OF THE INVENTION

Based on the aforementioned state of the art, it is the object of the invention to propose a contoured structural element suitable for use as a core layer in a curved sandwich composite element, which is realized such that the contoured structural element is fully made of a foamed thermoplastic and wherein the connecting layer between the body elements is reinforced such that it allows a hinge-like curvature of the body elements to each other and that it can be produced using a simple or non-complex method.

Furthermore, the object of the invention is to propose a method for producing a contoured structural element of this type and a curved sandwich composite element having a contoured structural element of this type as the core layer.

Regarding the contoured structural element, this object is attained by the features disclosed herein; regarding the method, it is attained by the features also as disclosed herein; and regarding the curved sandwich composite element, it is attained by the features as disclosed herein. Advantageous embodiments are also described herein and in the dependent claims.

According to the invention, a contoured structural element for use as a core layer in a curved sandwich composite element is proposed, the contoured structural element being formed from a thermoplastic foam, in particular PET, the contoured structural element being subdivided, except for a connecting layer, into a plurality of body elements, and the body elements and the connecting layer being aligned parallel to a base area of the contoured structural element which is in a in a planar state. At least one surface layer of the connecting layer and the adjoining surface layer of the body elements at least partly have a thermally densified layer, the body elements, the connecting layer and the thermally densified layer being made of the same material.

Surprisingly, it has been discovered in the present invention that because of the reinforcement according to the invention of the surface layer of the contoured structural element, in particular in the area of the connecting layer between the body elements, the use of an additional scrim material can be superseded and that complex, in particular time-consuming, steps of a scrim application method can be bypassed by means of the production method according to the invention. Thus, a structural element which has both a high mechanical stability and simultaneously does not require additional reinforcement materials can be provided in a particularly advantageous manner. Particularly surprisingly, it has also been discovered that in different methods for producing or forming the thermally densified layer, the thermally densified layer is formed with low dust levels or dust-free, for example by hot-element cutting, such that the adhesive or connection properties of the thermally densified layer and the mechanical stabilization are particularly good, for example to connect, in particular to glue, the thermally densified layer to a cover layer of a sandwich composite element.

Furthermore, it has been discovered in the invention that by thermally densifying a surface of the foamed plastic, a part of the pores can be closed and the local cross section can be enlarged, such that a ductile fracture behavior similar to a perforated plastic film can be set. Thus, the thermally densified layer functions like a locally reinforced scrim material and the foam material can be reinforced without a noticeable weight increase.

Furthermore, it has been discovered in the invention that the thermally densified layer not only stabilizes the contoured structural element but, simultaneously, the thermally densified layer also partly seals the opened pores in a surface of the contoured structural element, the surface having been processed previously by means of a cutting process, such that an unnecessary resin absorption can be prevented.

The thermally densified layer is made of the same material or created like the adjoining body elements and the connecting layer, if applicable. This means that the structural element according to the invention comprises exactly one material which forms the body elements in different spatial areas and which advantageously forms the connecting layer in other spatial areas and which also forms the thermally densified layer in once again other spatial areas in a thermally densified state. Overall, the invention results in a core layer which has a plurality of different areas but is made of only one material which locally underwent a transformation process, namely a densifying process in the densified layer.

According to the invention, the at least one surface layer of the connecting layer and the adjoining surface layer of the body elements form the base area of the contoured structural element, the thermally densified layer fully extending over the base area of the contoured structural element. This embodiment is particularly advantageous if the contoured structural element can be produced by means of a hot-wire cutting method and if the hot-wire cutting method simultaneously thermally densifies the base area of the contoured structural element and preferably partly seals the pores of the contoured structural element.

By means of a cutting method for separating, i.e., cutting, a plate-shaped structural element from a foam block or cutting of recesses in a plate-shaped structural element, pores of the otherwise preferably mostly closed-cell foam are opened, such that an adhesive or laminating resin, in particular a polyester resin, vinyl ester resin, epoxy resin or phenol resin, can enter the pores of the contoured structural element, the adhesive resin not having a positive impact on the adhesive effect above a certain penetration depth and thus penetration amount, but instead only increasing the weight of the contoured structural element, which is disadvantageous for the lightweight construction applications in which a sandwich component formed using such a contoured structural element is to be used. However, it must be kept in mind that a smooth, pore-free surface is also disadvantageous for the adhesion of the adhesive resin because the adhesive resin is not able to sufficiently anchor in the contoured structural element.

Therefore, a thermally densified layer according to the invention which is intended for the contact with adhesive resin is preferably designed such that the partly thermally sealed surface has less pores for the adhesive resin to permeate than an area in which the surface has been created by sawing, the remaining open pores allowing the resin to anchor.

A partly thermally sealed layer of this kind is described in DE 10 2012 102 689 A1, the respective disclosure being referred to in its entirety and the disclosed features of the partly sealed layer being included in the application in their entirety as part of the invention in a further development.

In particular if the contoured structural element is intended to be connected with two cover layers in a sandwich-like manner, it is preferably intended that a surface of the body elements which is parallel to the base area and opposite the connecting layer in the planar state of the contoured structural element has a thermally densified, preferably partly sealed surface layer. This achieves that the surfaces glued to the cover layer of a sandwich composite element are partly sealed, a reduced resin absorption and thus a lower weight of the sandwich composite element.

Further preferably, the thermally densified layer forms a planar and/or equally thick layer in a planar state of the contoured structural element, such that the connecting layer is evenly reinforced and partly sealed over the base area of the contoured structural element. This allows that mechanical weak points and a potential formation of cracks and a continuation of cracks at these points can be prevented. Furthermore, an even resin absorption and thus an even strength of an adhesive bond to a cover layer of a sandwich composite element can be achieved.

Particularly preferably, at least the surfaces of the contoured structural element intended for the contact with resin material are partly thermally sealed. Preferably, also the surfaces between the body elements which can be created by cutting processes in a plate, for example, are also partly thermally sealed, such that a resin absorption is also reduced there.

Preferably, the thickness of the thermally densified layer in the planar state of the contoured structural element perpendicular to the base area is between 0.01 mm and 1.00 mm, preferably between 0.10 mm and 0.70 mm, even further preferably between 0.15 mm and 0.60 mm, particularly preferably between 0.25 mm and 0.35 mm. The mechanical stability increases as thickness increases, while in contrast the adhesion of an adhesive resin to the thermally densified layer decreases as thickness increases because the pores of the thermoplastic foam are increasingly sealed. A thickness of the thermally densified layer according to the invention preferably ensures a sufficient mechanical stability and simultaneously a sufficient adhesion to a cover layer of a sandwich composite element.

Particularly preferably, the thermally densified layer entirely forms the connecting layer. In this case, the connecting layer does not comprise additional brittle foam material which can break in the curved state or at a low stress. Broken foam material can cause a dust formation or loose foam elements which can contaminate a sandwich composite element and reduce its mechanical properties.

For the thermally densified, preferably partly sealed layer, a gloss value of the thermally densified surface measured at 60° according to DIN 67530-1982 should be between 2 and 10 gloss units. 100 gloss units correspond to a glass reference body, for example a planar, polished black glass plate. If the thermally densified layer is produced by a hot-element cutting method, then it must be ensured for the measurement of the gloss value that the beam direction is parallel to the cutting direction of the hot-element cutting. Using the gloss value as a parameter for describing the surface of the thermally densified layer is based on the idea that in particular a fully sealed surface having an insufficient amount of pores having an insufficient resin absorption reaches too high a gloss value, which is then accompanied by a bad adhesive effect and, on the other hand, a too highly brittle surface, as is received by sawing, has too low a gloss value, which is accompanied by a good adhesion but too high a resin absorption.

In an embodiment, the contoured structural element is preferably subdivided into body elements according to a regular checkerboard-like and/or hexagonal pattern. Advantageously, this subdivision can be realized in a two-step or multi-step sawing process. This is particularly advantageous if the curved state of the structural element is not predetermined and the contoured structural element is to be used universally for unilateral or bilateral curvatures and different curvature radii.

Alternatively, the contoured structural element is subdivided according to the curvature of the structural element. For example, by subdividing the contoured structural element into a plurality of body elements in a curved first section and into a second plurality of body elements in a second section which is less strongly curved than the first section, the second plurality being smaller than the first plurality and preferably comprising a larger cross section or a larger volume than the first plurality. This means that preferably the size and/or shape and/or the volume of the respective body elements can be adapted to the shape required of the structural element, in particular to the curvature.

Preferably, the body elements have a rectangular cross section or a trapezoidal cross section. A rectangular cross section can be produced or formed particularly easily. However, a trapezoidal cross section can be advantageous if spaces between the body elements are to be closed in the curved state of the contoured structural element.

In another embodiment, the body elements are thermally welded together, preferably across their entire surface, in the curved state of the contoured structural element. This can strengthen the curved state of the contoured structural element. If the space between the body elements is not fully closed in the curved state of the contoured structural element, it is preferred that at least the surfaces of the body elements opposite the base area of the contoured structural element are welded together at least linearly on the edges towards the spaces, such that the side opposite the base area of the contoured structural element forms a closed surface to prevent resin material from penetrating into the spaces between the body elements. By welding the body elements, the stiffness of a curved sandwich composite element can be increased additionally.

It is particularly advantageous if welding together the body segments is carried out by melting the entire lateral surfaces of the body segments to be connected, for example by means of a hot element or heating blade, and subsequently combining of the same, the melt zones curing by forming the extensive welding seams in the form of low-porous or pore-free intermediate layers of plastic, which is preferably carried out without additional additives such as adhesive resin, such that the contoured structural element itself is made of only plastic, namely thermoplastic, in particular PET.

In a particularly advantageous embodiment of the invention, the temperature of the hot element(s) is set such and, simultaneously, the relative velocity between hot element or elements and body element is selected such that the aforementioned gloss value is within a value range of 2 and 10.

Furthermore, it is preferred that the thermally densified layer withstands more than 20, preferably more than 40, even further preferably more than 300, particularly preferably more than 1000 bending cycles between 0° and 180°, the curvature being formed such that the space between the body elements increases. In the case of a contoured structural element without thermally densified layer, the connecting layer breaks at as early as less than 20 bending cycles on overage.

Preferably, the densified, preferably partly sealed layer of the contoured structural element is created by hot-wire cutting. Advantageously, cutting a contoured structural element by means of hot-wire cutting simultaneously allows the thermal densification of the cut surfaces of the contoured structural element.

The invention also relates to a method for producing a contoured structural element which is described above and formed according to the concept of the invention, a plate-shaped structural element which is separated from a preferably extrusion-foamed thermoplastic block, in particular PET, being provided. In the course of this, the separated surfaces are thermally densified, preferably at least the base area of the plate-shaped structural element is thermally densified.

Preferably, creating the thermally densified surface, preferably the thermally densified base area, can be created or produced by means of hot element cutting. In general, however, other methods can also be used. For example, a contact with a heated surface can be used to produce the thermally densified layer.

According to the teachings of the invention, it can be intended that the thermally densified layer is formed before the body elements are formed, for example by cutting, sawing, hot-element cutting, milling or the like. This can be particularly advantageous if the thermally densified layer is created simultaneously with the cutting of plate-shaped structural elements from a larger foam body or foam block, such that plate-shaped structural elements having unilaterally or bilaterally thermally densified surfaces are created first. Based on one of these surfaces with or without a thermally densified layer or surface layer, recesses/contours can be created to contour the plate-shaped structural element and to subdivide it in body elements having a connecting layer.

Alternatively, however, it can also be intended that a contoured structural element is formed first, which is then subsequently provided with the thermally densified layer(s) or surface layer(s).

The following description of a hot-element cutting method for producing a plate-shaped structural element having a partly thermally sealed layer is described in DE 10 2012 102 689 A1, the respective disclosure being referred to in its entirety. The content of the disclosure DE 10 2012 102 689 A1 is also fully part of this disclosure.

The temperature of the hot element, in particular a hot wire, in particular in combination with the relative velocity of the hot element to a foam block has proved to be critical for the process of the hot-element cutting method. Good results regarding the intended surface quality have been achieved with a hot element temperature from a value range between 300° C. and 700° C., in particular between 400° C. and 700° C., preferably between 500° C. and 700° C., with this temperature being provided at least at the start of a cutting or separating process. Preferably, the temperature is also kept at least approximately during the cutting or separating process.

In combination with the temperature described above, it is essential for separating that a relative velocity between a hot element and a foam block by moving the hot element and/or the foam block is from a value range between 50 mm/min and 150 mm/min.

The aforementioned temperature values and feed rate values apply in particular to a foam block material having a density (including air lock) from a value range between 50 kg/m³ and 250 kg/m³, preferably between 60 kg/m³ and 150 kg/m³.

It has been discovered that the optimum feed rate for achieving the intended gloss value depends on the density of the foam block to be processed. For a foam block having a density of 60 kg/m³, the feed rate of the hot element is preferably chosen from a value range between 100 mm/min and 140 mm/min. For a foam block having a density of 100 kg/m³, the feed rate is preferably chosen from a value range between 65 mm/min and 85 mm/min. For a foam block having a density of 130 kg/m³, the feed rate is preferably chosen from a value range between 50 mm/min and 70 mm/min.

This, in turn, is connected with the fact that the required sealing energy per surface to be partly sealed by means of the hot element depends on the density of the foam block.

It has been discovered that the following functional relationship applies for the calculation of energy:

$$E = \tfrac{1}{2} \times (U \times I)/(v \times L)$$

E stands for the energy to be introduced per surface to be partly sealed. The used electrical energy is calculated from the product of the electric voltage U applied to the hot element and the electric current I of the current flowing through the hot element. This product is divided by the product from the feed rate v of the hot element, in particular the hot wire and the length L of the hot element, measured perpendicular to the feed direction. The unit of energy is Wh/m², with W standing for watt, h for hours and m² for square meter. The factor ½ takes into account that two partly sealed surfaces are created simultaneously per hot element.

Preferably, the width of the foam block, measured parallel to the longitudinal dimension of the hot element, corresponds to at least 60%, preferably between 70% and 95%, of the length of the hot element.

Ideal gloss values of the resulting surface of the corresponding surface side are achieved if per surface to be partly sealed via the hot element, in particular the hot wire, an energy is introduced which is calculated according to the following functional linear relationship:

$$E \, [\text{Wh/m}^2] = m \, [\text{Whm/kg}] \times \text{density foam block} \, [\text{kg/m}^3] + b \, [\text{Wh/m}^2]$$

Preferably, m is selected from a value range between +0.12 and +0.20 Whm/kg, even further preferably from a value range between +0.12 and +0.18 Whm/kg. Simultaneously, b is preferably selected from a value range between −0.5 and +0.5 Wh/m², particularly preferably between −0.5 and 0.0 Wh/m².

For a density of 60 kg/m³, this results in the following, preferred limits for the preferably introduced energy/sealing energy per surface: 6.7 Wh/m² to 12.5 Wh/m², in particular 6.7 Wh/m² to 10.8 Wh/m². For a density of the foam block of 100 kg/m³, this results in preferred energy ranges between 11.5 Wh/m² and 20.5 Wh/m², preferably between 11.5 Wh/m² and 18.0 Wh/m². For a foam material having a density of 130 kg/m³, this results in preferred limits for the introduced energy between 15.1 Wh/m² and 26.5 Wh/m², preferably between 15.1 Wh/m² and 23.4 Wh/m².

It has proven to be even more preferred if the diameter of the preferably cylindrical hot wire is selected from a diameter value range between 0.25 mm and 2.0 mm, in particular between 0.25 mm and 1.00 mm, preferably between 0.40 mm and 0.80 mm.

As mentioned above, the dividing of the foam block into the plate-shaped structural element can advantageously be followed by creating, in particular cutting, of recesses in at least one side, in particular the side opposite of the base area of the plate-shaped structural element, by means of a sawing, laser-engraving, milling or heat cutting method, such that the plate-shaped structural element is subdivided, except for a connecting layer, into a plurality of body elements and the contoured structural element according to the invention is formed.

In particular a laser-engraving or heat cutting method can simultaneously thermally densify the cut surfaces of the body elements and additionally reinforce the connecting layer. Preferably, however, a sawing process is used because of the higher process speed.

The invention also relates to a sandwich composite element, in particular for the production of wind vanes for wind turbines and/or for marine applications, in particular for the production of boat hulls, boat decks, for rail transport applications, in particular for the production of train fronts, roofs, floors, wall elements of rail carriages, for road mass transport applications, in particular for the production of bus roofs, floors and fronts, for structural applications in the construction sector, for example roofs and much else, the curved sandwich composite element comprising at least one cover layer connected to the contoured structural element in addition to the contoured structural element according to the invention, the curved sandwich composite element comprising in particular two cover layers accommodating the contoured structural element between them, the at least one cover layer preferably being made of fiberglass-reinforced plastic.

The invention is preferably suitable for producing curved sandwich composite elements in a resin infusion process. The fiber composite, non-crimp fabric or woven fabric, including core material, is assembled in the dry state. Subsequently, it is covered by means of a vacuum-sealed foil and sealed on the edge. A vacuum applied at the foil eventually draws the liquid resin from a storage container through the assembly and thus soaks the composite. The curing or the resin reaction is usually carried out at room temperature but it can also be carried out at an increased temperature.

Thus, the invention in particular also relates to a curved sandwich composite element which has been produced in the resin infusion process, with it being essential that the resin, specifically the laminating resin, is soaked into the layer assembly by means of a vacuum, with it being particularly preferred if the resin connecting the cover layers to the contoured structural element is also the resin of the cover layers by means of which the non-crimp fabric or woven fabric of the cover layers is soaked.

BRIEF DESCRIPTION OF THE DRAWINGS

Further advantages and details of the invention can be derived from the following description of preferred embodiments of the invention as well as by means of the drawings.

Identical elements or elements having identical functions have identical reference signs in the figures.

DETAILED DESCRIPTION

Figure 1:
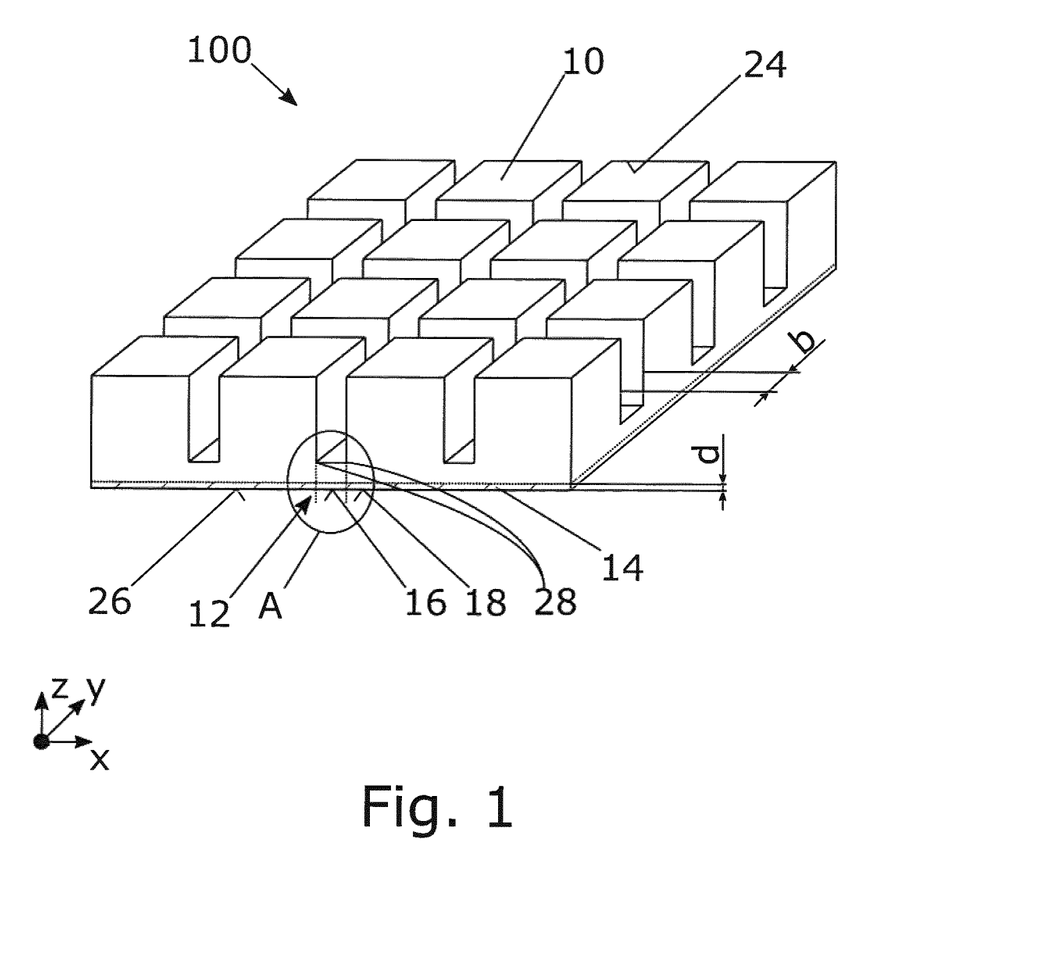
FIG. 1: shows a perspective view of the contoured structural element consisting of rectangular body elements having a connecting layer and a thermally densified base area.

FIG. 1 shows a contoured structural element 100 for use as a core layer in a curved sandwich composite element made of a thermoplastic foam, contoured structural element 100 being subdivided into a plurality of body elements 10, except for a connecting layer 12 of the same material. Contoured structural element 100 is shown in a planar, non-curved state and body elements 10 and connecting layer 12 are parallel to a base area 26 of contoured structural element 100. According to the definition of the present invention, a transition is formed between adjoining body elements 10 by a connecting layer 12, except for edge portions which is marked in a connecting area A in FIG. 1 and limited by dashed vertical lines.

A surface layer 16 of connecting layer 12 and adjoining surface layer 18 of body elements 10 have a thermally densified layer 14. Thermally densified layer 14 is made of the same material as body elements 10 and connecting layer 12.

Contoured structural element 100 is preferably subdivided such that surface layer 16 of connecting layer 12 and surface layer 18 of body elements 10 form base area 26 of contoured structural element 100. In this case, preferably all of base area 26 of contoured structural element 100 has a fully thermally densified layer 14. Advantageously, this fully thermally densified layer 14 can be produced by means of a hot-wire cutting method, all of base area 26 of contoured structural element 100 being densifiable in a short space of time.

Figure 5A:
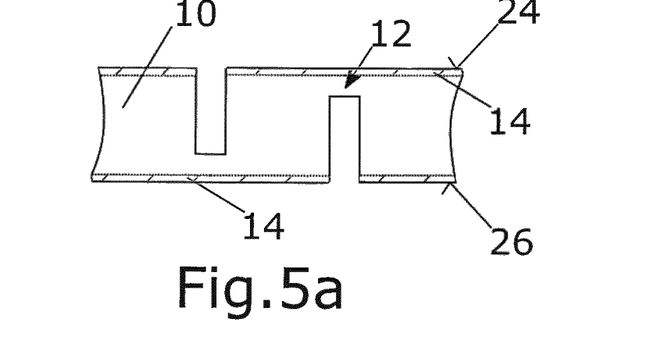
FIG. 5a: shows a side view of the contoured structural element, the connecting layer being disposed in the base area and the opposite surface of the body elements.
Figure 5B:
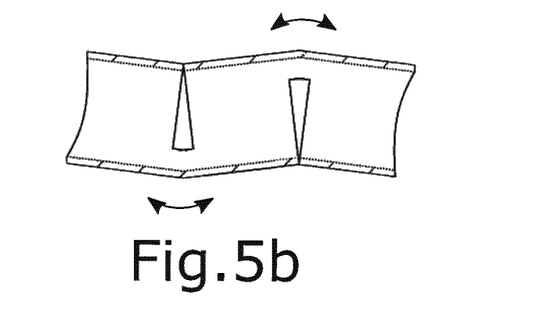
FIG. 5b: shows a side view of the contoured structural element according to FIG. 5a in a double-curved state.

Preferably, a surface 24 of body elements 10 which is aligned parallel to base area 26 and opposite connecting layer 12 in the planar state of contoured structural element 100 has a thermally densified, preferably partly sealed surface layer 14 (see FIG. 5a). In particular if contoured structural element 100 comes into contact with resin material on both sides, a bilaterally applied partial thermal seal it is particularly advantageous.

It should be mentioned that thermally densified layer 14 of contoured structural element 100 applies to a thermal treatment of contoured structural element 100 itself and not to a subsequently applied/adhered thermally densified layer of an identical or different material. This means that there is a transition provided from a densified to a non-densified area in the same coherent or one-piece material but that there is/are no connecting surface/s on which different material layers are connected to each other. Body elements 10, connecting layer 12 and thermally densified layer 14 can thus preferably be produced of the same material and from a one-piece base element, for example a plate-shaped structural element.

Alternatively, it is possible that surface layer 16 of connecting layer 12 and adjoining surface layer 18 of body 10 partially have a thermally densified layer 14, preferably in a connecting area A, such that in particular also the area of edges 28 between connecting layer 12 and body elements 10 is stabilized by thermally densified layer 14. When bending stress is exerted on contoured structural element 100, in particular the area of edges 28 of connecting layer 12 can break because of increased notch stress, such that surface layer 18 of body elements 10 is at least reinforced in connecting area A.

In a planar state of contoured structural element 100, thermally densified layer 14 preferably forms a planar and/or evenly thick layer, such that connecting layer 12 is evenly reinforced over base area 26 of contoured structural element 100.

More preferably, at least the surfaces of contoured structural element 100 intended for the contact with resin material are partly thermally sealed. The preferred surfaces of contoured structural element 100 include in particular base area 26 of contoured structural element 100 and surface 24 of body elements 10 opposite base area 26. Additionally, surfaces 20 of body elements 10 facing a space 32 according to FIG. 2a can be partly thermally sealed. The partial seal can have an advantageous influence on the connection properties and the resin absorption of the surfaces. This can also achieve a dust reduction which also improves the aforementioned properties.

Preferably, the thickness d of the thermally densified layer 14 in the planar state of contoured structural element 100 perpendicular to base area 26 is between 0.01 mm and 1.00 mm, preferably between 0.10 mm and 0.70 mm, even further preferably between 0.15 mm and 0.60 mm, particularly preferably between 0.25 mm and 0.35 mm. Preferably, this thickness d of thermally densified layer 14 ensures a sufficient mechanical stability of connecting layer 12 and a sufficient adhesion to a cover layer of a sandwich composite element. The mechanical stability increases as thickness d increases. In contrast, the adhesion to a cover layer decreases as thickness d increases because pores of the thermoplastic foam are increasingly sealed, such that a resin material is unable to anchor in the enlarged surface of the pores in a later adhesive process or laminating process or vacuum injection process.

Connecting layer 12 can be realized such that it is formed by the actual thermally densified layer 14 itself. For example, contoured structural element 100 can be sawn in through or until just before thermally densified layer 14. It can thus be prevented that undensified and therefore brittle foam material between body elements 10 remains which can easily break in certain circumstances and which can contaminate the sandwich composite element or reduce the mechanical stability of the sandwich composite element because of loose elements.

Alternatively, the thermally uncured layer of connecting layer 12 should preferably be reduced to a minimum because it would otherwise limit the curvature of the structural element and the hinge-like effect of connecting layer 12.

For the thermally densified, preferably partly sealed layer 14, a gloss value of the thermally densified surface, for example thermally densified base area 26, measured at 60° according to DIN 67530-1982 should be between 2 and 10 gloss units.

As shown in FIG. 1, contoured structural element 100 is preferably subdivided into body elements 10 according to a regular checkerboard-like pattern. Advantageously, this subdivision can be realized in a two-step sawing process in which sawing patterns which are preferably disposed angular, in particular rectangular, to each other are created using one saw or a plurality of saws.

Additionally or alternatively, contoured structural element 100 can also be subdivided into body elements 10 according to a preferably regular hexagonal pattern.

Figure 2A:
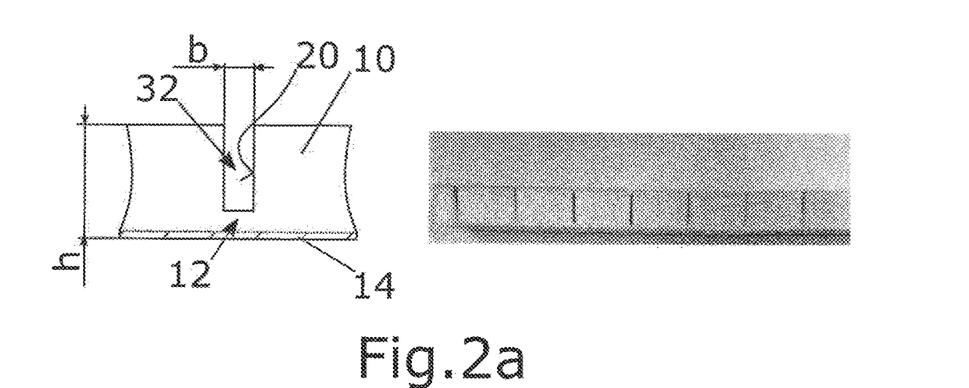
FIG. 2a: shows a side view of two body elements according to FIG. 1 with a photograph of the respective component.

As shown in FIG. 1 and the detailed view in FIG. 2a, body elements 10 have a preferably rectangular cross section. Advantageously, this cross section can be realized in a two-step sawing process. In a curved state of contoured structural element 100 according to FIG. 2b, the body elements can be curved around the y-axis. A two-sided curvature (not shown) around the x-axis and the y-axis is also possible. Body elements 10 are preferably curved towards each other until inner surfaces 20 of body elements 10 are at least partly in contact at a contact surface 30. Body elements 10 having a rectangular cross section are easy to produce, however, contoured structural element 100 then has spaces 32 even in the curved state. These spaces 32 could be filled with resin material in a later process and the weight of contoured structural element 100 could increase.

Figure 2B:
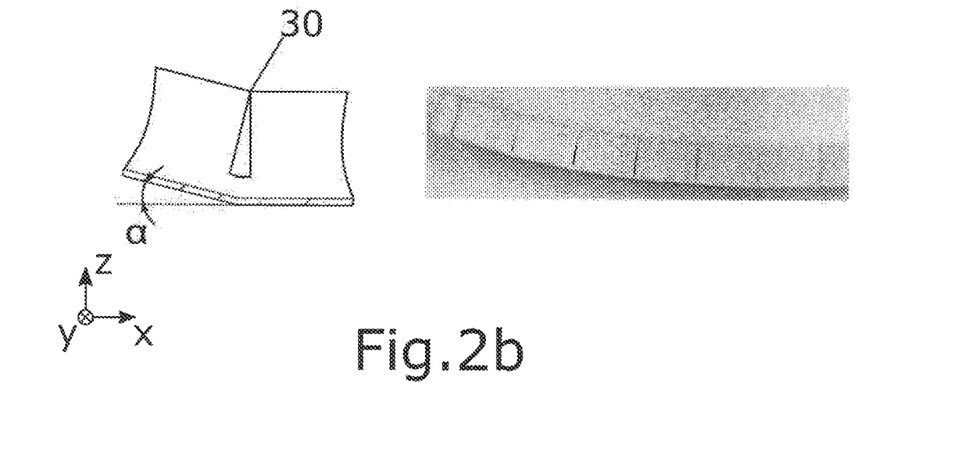
FIG. 2b: shows a side view according to FIG. 2a in a curved state.

The maximum angle of curvature α between two body elements 10 is preferably between 2° to 3°, such that the gradient steps in the curved surface 26 of contoured structural element 100 are small enough for the deviation from, for example, a circular arc to be offset with resin material such that the gradient steps in a cover layer glued to curved contoured structural element 100 are not transferred. With severely curved sandwich composite elements, the number of body elements 10 per longitudinal unit must be increased accordingly.

Figure 3A:
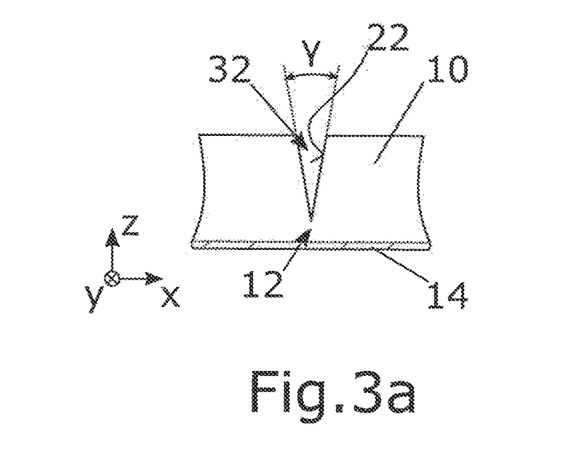
FIG. 3a: shows a side view of two body elements according to FIG. 2a, the body elements having a trapezoidal cross section.
Figure 3B:
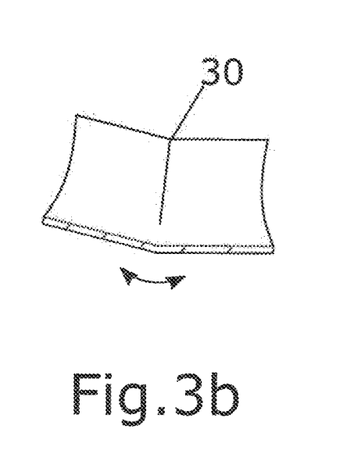
FIG. 3b: shows a side view according to FIG. 3a in a curved state.

To prevent the containment of resin material in space 32, body elements 10 alternatively have a trapezoidal cross section according to FIG. 3a, such that in the curved state of contoured structural element 100, surfaces 20 of body elements 10 facing space 32 are in contact at least partly, preferably over the entire surface. In FIG. 3b, such a curved state is shown, all of space 32 between body elements 10 being closed. Preferably, the dimensions of the trapezoidal cross section are designed depending on angle of curvature α, such that body elements 10 are preferably fully in contact in the curved state of contoured structural element 100, for example by designing and opening angle γ of space 32 between the trapezoidal body elements according to the intended curvature of structural element 100. The cross section of body elements 10 can have a complex geometry if a two-sided curvature around the x-axis and around the y-axis is required and the respective curvature can have different angles of curvature.

Preferably, a width b of space 32 between body elements 10 and a height h of contoured structural element 100 or a height of space 32 according to the curvature of contoured structural element 100 is chosen such that in the curved state of contoured structural element 100, surfaces 20 of body elements 10 facing each other in a space 32 are in contact at least partly, preferably over the entire surface 20. A resin absorption can be prevented by means of a closed space 32. In this case, the subdivision of contoured structural element 100 can differ from a regular checkerboard-like pattern.

Furthermore, it is conceivable to thermally weld together body elements 10 along contact surface 30, such that the curved state of contoured structural element 100 is strengthened and to permanently prevent resin material from penetrating into space 32 of body elements 10. Preferably, contact surfaces 30, as shown in FIG. 3b, are welded together entirely.

Figure 4A:
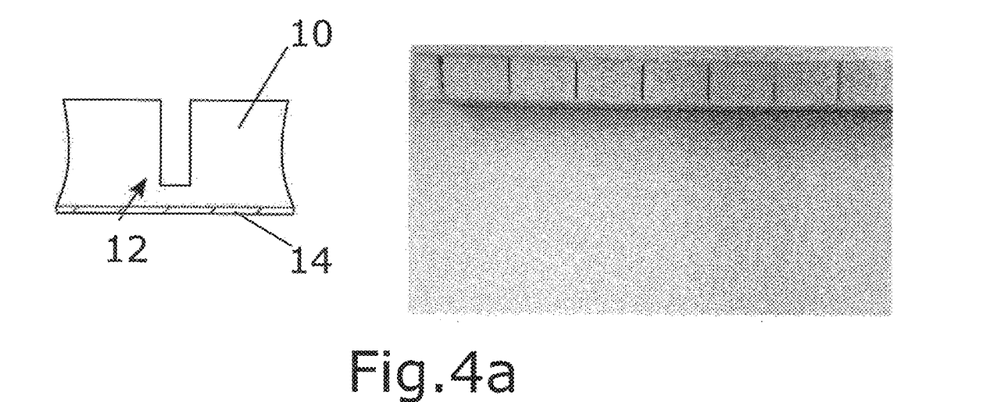
FIG. 4a to FIG. 4c: shows a side view of two body elements according to FIG. 2a, the contoured structural element being shown in three curved states between 0° and 180°.
Figure 4B:
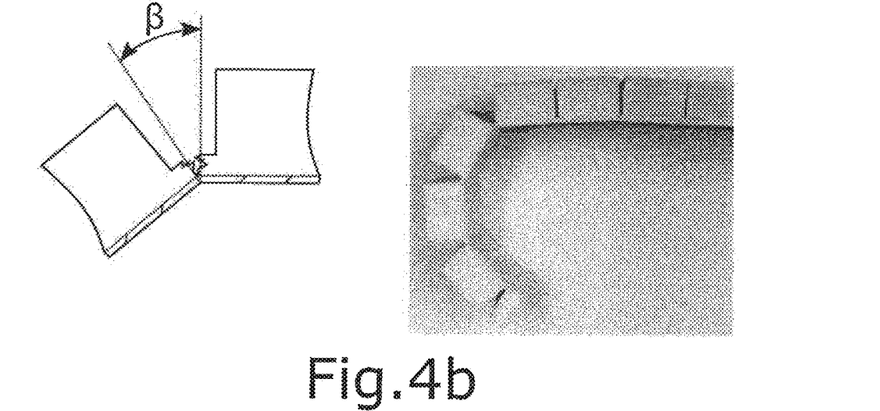
Figure 4C:
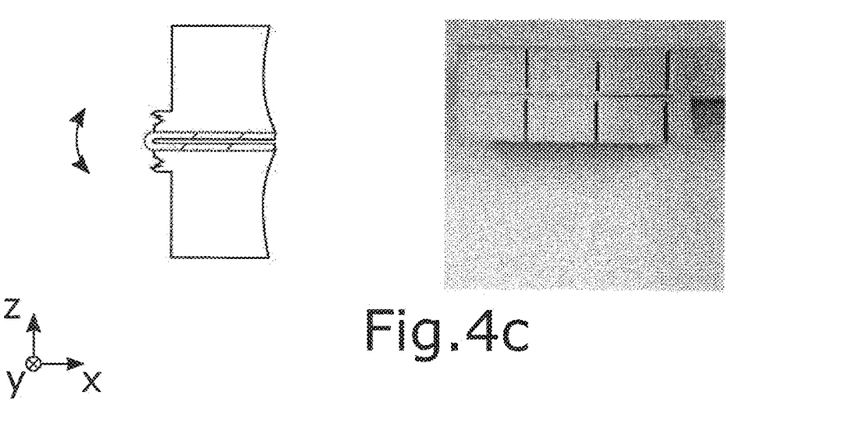

When handling contoured structural element 100 or for sandwich composite elements having curvatures in different directions, it may occur that contoured structural element 100 is curved such that space 32 increases compared to the planar state of contoured structural element 100. In FIG. 4a to FIG. 4c, such a curvature of contoured structural element 100 around an angle β is shown in three states between 0°, a planar contoured structural element 100, and 180°, a maximally curved contoured structural element 100. FIG. 4b shows an angle β of approximately 50°, an undensified part of connecting layer 12 being broken and body elements 10 only being held together by means of thermally densified layer 14. Body elements 10 can be curved until the state shown in FIG. 4c without causing thermally densified layer 14 to tear. For a contoured structural element 100 having a thermally densified layer 14, a bending cycle between 0° and 180° can be repeated more than 20, preferably more than 40, even further preferably more than 300, particularly preferably more than 1000 times without causing thermally densified layer 14 to malfunction. If there is no thermally densified layer 14, body elements 10 break as early as during a low-medium bending cycle of less than 20 cycles.

The high fatigue limit of thermally densified layer 14 allows replacing a scrim material, the stability not only being ensured for a small curvature in a mold, but also for stress when handling contoured structural element 100; for example if contoured structural element 100 is to be cut or oriented in a mold.

For a contoured structural element 100 having bilaterally thermally densified layers 14, it is possible, according to FIG. 5a, that connecting layer 10 extends either along base area 26 or the surface of body elements 24 opposite base area 26. This subdivision allows the production of a contoured structural element 100 for molds having changing curvature directions.

Figure 6A:
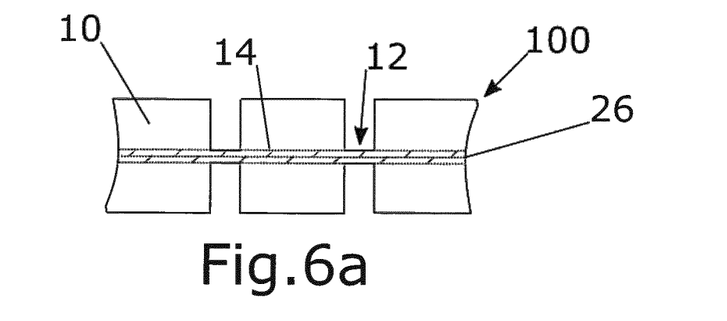
FIG. 6a: shows a side view of two contoured structural elements which are thermally welded together
Figure 6B:
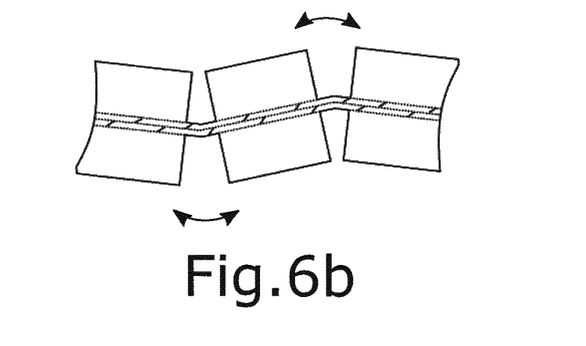
FIG. 6b: shows a side view of two contoured structural elements according to FIG. 6a in a double-curved state which are thermally welded together.

Alternatively, two contoured structural elements 100 according to FIG. 6a can also be welded together via their base area 26. This double contoured structural element is, as is shown in FIG. 6b, also suitable for changing curvature directions.

Preferably, the densified, preferably partly sealed layer 14 is created by hot-wire cutting. Using the hot-wire cutting method, contoured structural element 100 can be cut from a foam block and, simultaneously, base area 26 of structural element 100 and surface 24 of body elements 10 opposite base area 26 can be densified and partly sealed.

Contoured structural element 100 shown in FIG. 1 is produced by a preferably plate-shaped structural element made of extrusion-foamed thermoplastic preferably having thermally densified surfaces. Subsequently, the plate-shaped structural element is subdivided, except for a connecting layer 12, into a plurality of body elements 10, in particular by means of cutting recesses into at least one side of the plate-shaped structural element by means of sawing, laser-engraving, milling or a heat cutting method.

A sandwich composite element can be produced by fixing a cover layer, in particular made of fiber-reinforced plastic, on base area 26 of contoured structural element 100 and surface 24 of body elements 10 opposite base area 26, preferably by means of a resin.

Preferably, a first cover layer and/or a second cover layer are fixed during the infusion process.

The described contoured structural element 100 can be varied or modified in many ways without departing from the concept of the invention. For example, it is conceivable to thermally densify spaces 32 of body elements 10 using a hot wire, laser or hot element pin. In this way, for example, the double contoured structural element shown in FIG. 6a can be produced in one piece by cutting into a plate-shaped structural element from two sides and, subsequently, locally thermally densifying connecting layer 12 or by thermally densifying the surfaces of spaces 32 between body elements 10 during the cutting process by means of a laser-engraving process or a hot element (wire, pin, or a hot blade).

REFERENCE SIGNS 10 body element
12 connecting layer
14 thermally densified layer
16 surface of the connecting layer
18 surface of the body element
20 surface of the body element in a space
24 Surface opposite the base area
26 base area of the contoured structural element
30 contact surface of the body elements
32 space between the body elements
100 contoured structural element
x, y, z spatial axes of a Cartesian coordinate system
α angle of curvature
β opening angle between body elements
γ opening angle between trapezoidal body elements
h height of the contoured structural element
b width of the space
d thickness of the thermally densified layer

The invention claimed is:

1. A contoured structural element (100) for use as a core layer in a curved sandwich composite element, the contoured structural element (100) being formed from a PET-foam, the contoured structural element (100) being subdivided, except for a connecting layer (12), into a plurality of body elements (10), and the body elements (10) and the connecting layer (12) being aligned parallel to a base area (26) of the contoured structural element (100) which is in a planar state, at least one surface layer (16) of the connecting layer (12) and an adjoining surface layer (18) of the body elements (10) at least partly having a thermally densified layer (14); the body elements (10), the connecting layer (12) and the thermally densified layer (14) being made of the same material,
wherein
the at least one surface layer (16) of the connecting layer (12) and the adjoining surface layer (18) of the body elements (10) form the base area (26) of the contoured structural element (100) and wherein the thermally densified layer (14) fully extends over the base area (26) of the contoured structural element (100).

2. The contoured structural element according to claim 1, wherein
a surface of the body elements (24) which is parallel to the base area (26) and opposite the connecting layer (12) in the planar state of the structural elements (100) also has a thermally densified surface layer (14).

3. The contoured structural element according to claim 1, wherein
in a planar state of the structural element (100), the thermally densified layer (14) forms a planar and/or equally thick layer.

4. The contoured structural element according to claim 1, wherein
at least the surfaces of the structural element (100) intended for contact with resin material are partly thermally sealed.

5. The contoured structural element according to claim 1, wherein
a thickness (d) of the thermally densified layer (14) in the planar state of the structural element (100) perpendicular to the base area is between 0.01 mm and 1.00 mm.

6. The contoured structural element according to claim 5, wherein the thickness (d) is between 0.10 mm and 0.70 mm.

7. The contoured structural element according to claim 5, wherein the thickness (d) is between 0.15 mm and 0.60 mm.

8. The contoured structural element according to claim 5, wherein the thickness (d) is between 0.25 mm and 0.35 mm.

9. The contoured structural element according to claim 1, wherein
the thermally densified layer (14) forms the connecting layer (12).

10. The contoured structural element according to claim 1,
wherein
a gloss value of a surface of the thermally densified layer (14) is between 2 and 10 gloss units, measured at 60° according to DIN 67530-1982.

11. The contoured structural element according to claim 1, wherein
in the curved state of the structural element (100), the body elements (10) are thermally welded together.

12. The contoured structural element according to claim 11, wherein the body elements (10) are thermally welded together so as to be flat.

13. The contoured structural element according to claim 1,
wherein
the densified layer (14) is created by hot-wire cutting.

14. The contoured structural element according to claim 1, wherein the thermally densified layer (14) is a partly sealed layer.

15. A unilaterally or multilaterally curved sandwich composite element for the production of wind vanes for wind turbines and/or for marine applications and/or rail transport applications and/or road mass transport applications and/or for structural applications in the construction sector, having a contoured structural element according to claim 1 as the core layer, a cover layer formed from or comprising fiber-reinforced plastic, being fixed on at least one side of the contoured structural element by means of an adhesive resin.

16. A method for producing a contoured structural element according to claim 1, comprising the steps:
providing a plate-shaped structural element made of extrusion-foamed thermoplastic,
creating recesses in at least one side of the plate-shaped structural element by means of a sawing, laser-engraving, milling or heat cutting method, such that the plate-shaped structural element is subdivided, except for a connecting layer (12), into a plurality of body elements (10), further comprising creating a thermally densified layer (14) in at least one surface layer (16) of the connecting layer (12) and at least partly in the adjoining surface layer (18) of the body elements (10), and in the base area (26).

17. The method according to claim 16, wherein the creating step comprises cutting the recesses in the side of the at least one side that is opposite of base area 26 of the plate-shaped structural element.

18. A method for producing a unilateral or multilateral curved sandwich composite element having a contoured structural element according to claim 1, comprising the steps:

unilaterally or multilaterally curving the contoured structural element (100), connecting at least one side of the contoured structural element (100) to a cover layer made of adhesive resin in an infusion process.

\* \* \* \* \*